No. 732,237. PATENTED JUNE 30, 1903.
E. B. TRAGLER.
RUBBER TIRE.
APPLICATION FILED JAN. 26, 1903.
NO MODEL.

Witnesses:
Maude Zwisler.
Walter Bowman.

Inventor:
Edward B. Tragler,
By C. E. Humphrey.
Atty.

No. 732,237. Patented June 30, 1903.

UNITED STATES PATENT OFFICE.

EDWARD B. TRAGLER, OF AKRON, OHIO.

RUBBER TIRE.

SPECIFICATION forming part of Letters Patent No. 732,237, dated June 30, 1903.

Application filed January 26, 1903. Serial No. 140,616. (No model.)

*To all whom it may concern:*

Be it known that I, EDWARD B. TRAGLER, a citizen of the United States, residing at Akron, in the county of Summit and State of Ohio, have invented a certain new and useful Improvement in Rubber Tires, of which the following is a complete specification.

My invention has relation to the production of an elastic tire for vehicles, especially relating to one which can be applied to an ordinary vehicle-wheel without the necessity of placing thereon a metallic channel of special construction for its reception.

The object of my invention is to so construct a tire that it can be readily placed on an ordinary wheel and be there sustained without the use of a channeled iron tire to retain it in position, and thereby remove the objectionable features of side flanges and render the wheel thus more serviceable.

The use of flanges for retaining a rubber tire in position is attended with certain objections which prove a decided drawback in the use of the wheel thus constructed. This objectionable feature consists in a tendency to slide when encountering raised obstructions in the street—such as railroad-rails, street-car tracks, &c.—and this objection has proved so much of a detriment to the use of flanged wheels that other devices are sought for and needed for retaining an elastic cushion on the periphery of a vehicle-wheel.

To the accomplishment of the aforesaid object my invention consists in the peculiar and novel construction, arrangement, and combination of the various parts hereinafter described, and then specifically claimed, reference being had to the accompanying drawings, forming a part of this specification.

Figure 1:
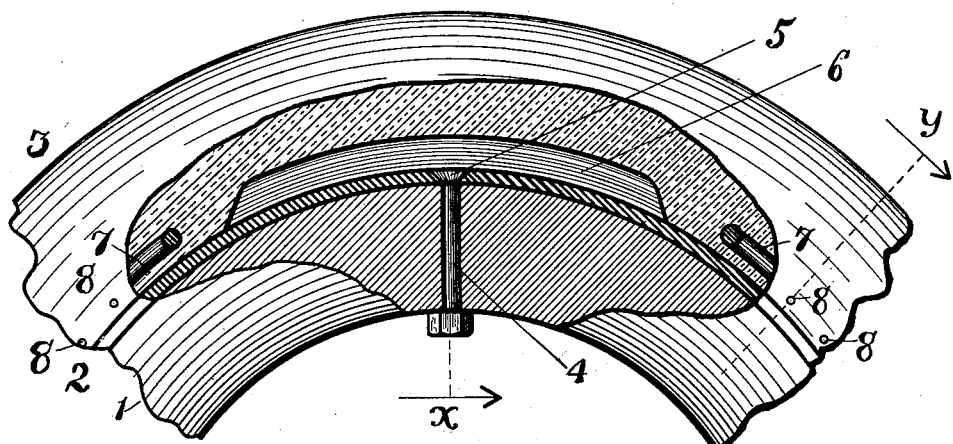
Figure 2:
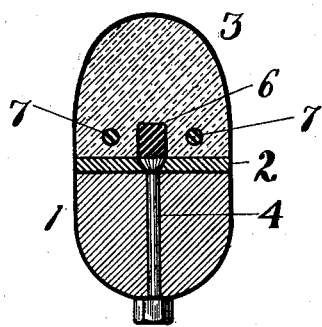
Figure 3:
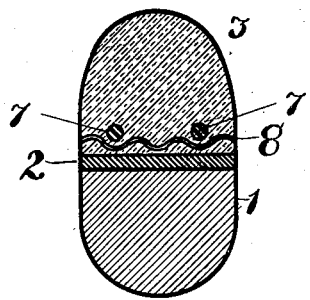

In the accompanying drawings, in which similar reference-numerals indicate like parts in the different figures, Figure 1 is a side elevation of a wheel-felly provided with an ordinary iron tire and my improved elastic tire placed thereon with portions broken away to show the internal construction thereof; Fig. 2, a section at the line $x$, and Fig. 3 a section at the line $y$.

In the drawings, 1 represents the felly of a vehicle-wheel, 2 a flat metallic tire thereon of the ordinary common construction, and 3 my improved elastic tire placed in position on the iron tire.

In placing this elastic tire on an ordinary vehicle-wheel I remove the ordinary carriage-bolts from their places and insert in their place a T-shaped bolt 4. (Shown in Figs. 1 and 2.) This T-shaped bolt consists of a cylindrical depending stem of substantially the same diameter and size of the ordinary carriage-bolt and terminates at its upper end in a conical portion 5, on top of which and integral therewith is a long curved head 6, the curve of which is substantially equal to the curve of the iron tire to which these bolts are to be applied, so that they nicely fit and press upon the iron tire when in position. The ends of these heads are slanting and the upper surface thereof is slightly rounding in order to prevent injury to the rubber tire which is designed to inclose them.

The rubber tire is constructed with two holes for longitudinal wires 7 and has a flat surface to nicely fit and seat on the iron tire 2. At intervals in the under face or base of the rubber tire are grooves of substantially the same size and shape as the head 6 of the bolt 4. As the T-shaped bolts 4 are designed to be placed substantially centrally between the spokes of the wheel, the exact location of the grooves in the rubber tire to fit over the heads of the bolts 4 may be readily determined. At short intervals in the tire, between the grooves which are to encompass or inclose the T-shaped bolts 4, I place transverse waving or corrugated wires 8 through the body of the tire and which are vulcanized in place when the tire is cured. These transverse corrugated wires are used to add additional stiffness to the tire in those places in which the T-shaped bolts do not occur.

In placing these tires in position the rubber tires are bent around the iron tire and placed so that the grooves in the elastic tire will inclose the T-shaped bolts 4, longitudinal wires 7 having been previously placed in the openings in the tire, and the ends of both the tire and wires are joined by any of the well-known common means now in use for these purposes. When thus applied, a tire is produced which is readily capable of being placed on any ordinary vehicle-wheel without the use of skilled labor and in a comparatively short time. It also renders the removal of the common iron tire from the wheel unnecessary, and thereby effects a saving of time and expense ordinarily rendered necessary by the removal of the iron tire to give place to a channeled tire for the holding of a rubber tire.

Should it be found in placing this tire that the holes for the reception of the ordinary carriage-bolts are not sufficiently numerous, additional holes may be drilled and countersunk in the iron tire to receive additional T-shaped bolts 4.

I am aware that it has heretofore been customary to place on the flat face of the ordinary vehicle-wheel tire a channeled tire for the reception of an elastic tire and that this channeled tire has been retained in place by bolts passing through the felly, the two tires, and engaging with their upper ends the longitudinal wires embedded in the rubber tire; but such I do not claim, as it is an object of my invention to do away with the necessity of placing any additional metallic tires on the outside of the ordinary flat vehicle-tire.

It is obvious from the previous description that the number of T-shaped bolts 4 will vary with the amount of strain which it is expected the tire will be obliged to stand.

Having thus described my invention, what I claim, and desire to secure by Letters Patent, is—

1. The combination with a felly of a wheel provided with an ordinary flat metallic tire, of T-headed bolts arranged to pass through said tire and felly provided with comparatively long, narrow heads, a rubber tire provided in its base portion with grooves adapted to inclose said T-heads and to seat on said metallic tire, longitudinal wires embedded in said rubber tire, separated from said T-headed bolts by a stratum of rubber and forming no connection therewith.

2. The combination with a felly of a wheel provided with an ordinary flat metallic tire, of T-headed bolts arranged to pass through said tire and felly provided with comparatively long, narrow heads, a rubber tire provided in its base portion with grooves adapted to inclose said T-heads and to seat on said metallic tire, longitudinal wires embedded in said rubber tire, separated from said T-headed bolts by a stratum of rubber, and transverse wires embedded in said rubber tire occurring at intervals between the places occupied by said T-headed bolts.

In testimony that I claim the above I hereunto set my hand in the presence of two subscribing witnesses.

EDWARD B. TRAGLER.

In presence of—
C. E. HUMPHREY,
MAUDE ZWISLER.